United States Patent [19]
Tanaka

[11] Patent Number: 6,072,640
[45] Date of Patent: Jun. 6, 2000

[54] WATERPROOF LENS BARREL

[75] Inventor: Hitoshi Tanaka, Saitama, Japan

[73] Assignee: Asahi Kogaku Kogyo Kabushiki Kaisha, Tokyo, Japan

[21] Appl. No.: 09/238,580

[22] Filed: Jan. 28, 1999

[30] Foreign Application Priority Data

Feb. 4, 1998 [JP] Japan .................................. 10-022908

[51] Int. Cl.⁷ .................................................. G02B 15/14
[52] U.S. Cl. .......................................... 359/694; 359/618
[58] Field of Search ................................... 359/694, 704, 359/618, 513; 396/25, 29

[56] References Cited

U.S. PATENT DOCUMENTS

| Re. 35,679 | 12/1997 | Tanaka | 359/694 |
|---|---|---|---|
| 5,066,965 | 11/1991 | Tanaka et al. | 354/64 |
| 5,077,567 | 12/1991 | Hariguchi et al. | 354/64 |
| 5,212,509 | 5/1993 | Kosako et al. | 354/64 |
| 5,243,467 | 9/1993 | Tanaka | 359/694 |
| 5,305,145 | 4/1994 | Tanaka | 359/513 |
| 5,335,028 | 8/1994 | Kosaka | 354/64 |
| 5,754,893 | 5/1998 | Nomura et al. | 396/29 |

FOREIGN PATENT DOCUMENTS

5-11160  1/1993  Japan ............................. G02B 7/04

*Primary Examiner*—Georgia Epps
*Assistant Examiner*—Y. Timothy Lee
*Attorney, Agent, or Firm*—Greenblum & Bernstein, P.L.C.

[57] ABSTRACT

A waterproof lens barrel which includes at least one water-tight movable barrel which is movable along an optical axis, the water-tight movable barrel includes: an outer barrel that is in sliding contact with an annular sealing member; an inner barrel that is positioned inside said outer barrel; at least one through-hole formed on the outer barrel; and at least one stopper pin that is supported by the inner barrel, the stopper pin being snugly fitted in the through-hole so that no force in the radial direction is inflicted on the outer barrel by the stopper pin, and the relative movement of the inner and outer barrels in the direction of the optical axis is determined by the stopper pin and the through-hole.

10 Claims, 6 Drawing Sheets

WATERPROOF LENS BARREL

BACKGROUND OF THE INVENTION

1. Field of the Invention

The present invention relates to a waterproof lens barrel constituting an outer thinner barrel and a thicker inner barrel, which can be moved in the optical direction.

2. Description of the Related Art

In a water-tight movable double-walled lens barrel which includes inner and outer barrels, the outer barrel is formed from metal in order to increase surface precision and surface hardness thereof. On the other hand, the inner barrel is made of a synthetic resin mold which can be easily formed into a desired shape. In this double-walled construction having inner and outer barrels, the two barrels have to be connected together. However, if for example, a screw is utilized to connect the two barrels, there is a tendency for the outer barrel to be deformed thereby. Consequently, even the slightest deformation of the outer barrel would endanger the drip-proof/waterproof properties thereof since the outer barrel is slidably fitted into an annular sealing member.

SUMMARY OF THE INVENTION

It is an object of the present invention to provide a drip-proof/waterproof lens barrel constituting an thinner outer barrel and a thicker inner barrel, wherein no deformation of the outer barrel is incurred, and wherein the outer barrel is fixed to the inner barrel.

To achieve the above mentioned object, according to the present invention, there is provided a waterproof lens barrel which includes at least one water-tight movable barrel which is movable along an optical axis, the water-tight movable barrel including: an outer barrel that is in sliding contact with an annular sealing member; an inner barrel that is positioned inside the outer barrel; at least one through-hole formed on the outer barrel; and at least one stopper pin that is supported by the inner barrel, the stopper pin being snugly fitted in the through-hole so that no force in the radial direction is inflicted on the outer barrel by the stopper pin, and the relative position of the inner and outer barrels in the direction of the optical axis is determined by the stopper pin and the through-hole. With such a structure, no deformation of the outer cylinder occurs, which in turn, helps to maintain a water-tight structure.

Preferably, the stopper pin has a flat head which is snuggly fitted into said through-hole and a male thread portion which is screw engaged with said inner barrel.

Preferably, the peripheral surface of the flat head has a circular shape in plan view, and the diameter thereof being substantially the same as the diameter of the through-hole.

Preferably, the inner barrel includes at least one non-circular nut receiving recess for receiving a non-circular nut, and wherein the male thread portion of the stopper pin is securely screwed into the non-circular nut. The non-circular nut is preferably utilized (and preferably made out of metal) in order to avoid possible stripping of a thread that would otherwise be formed in the inner barrel.

Preferably, the inner barrel includes a stopper surface that abuts against one end surface of said outer barrel, wherein the center of the through-hole is offset from the center of the non-circular nut in a direction opposing the stopper surface. Such a structure is employed in order to prevent any play between the inner and outer barrels.

Preferably, the inner barrel includes a linear movement guide projection which protrudes inward, and the nut receiving recess in formed by utilizing the extra thickness of the linear movement guide projection.

Preferably, the outer barrel is made from metal and the inner barrel is made from a synthetic resin mold. Forming the outer barrel from metal provides increased surface precision and surface hardness; for example, an aluminum alloy pressing which has been alumetized on the outer surface thereof, or thin stainless steel. Such surface precision and hardness is advantageous in attaining a water-tight structure.

According to another aspect of the present invention, there is provided a waterproof lens barrel including at least one water-tight movable barrel which is movable along an optical axis, the water-tight movable barrel including: an outer barrel having at least one through-hole, the outer barrel being in sliding contact with an annular sealing member; a stopper pin which has a flat head, the peripheral surface thereof having a circular shape in plan view, and the diameter thereof being substantially the same as the diameter of the through-hole(s); an inner barrel supporting the stopper pin which snugly fits through the through-hole, wherein no force in the radial direction is inflicted on the outer barrel by the stopper pin, the inner barrel being snugly fitted inside the outer barrel; and at least one nut receiving recess formed on the external periphery of the inner barrel, wherein a nut is inserted therein for receiving the stopper pin, the male thread portion of the stopper pin being securely screwed into the nut; wherein the at least one nut receiving recess is formed at the same circumferential position as at least one linear movement guide projection formed on the internal periphery of the inner barrel to thereby utilize a greater thickness thereat than the thickness of the rest of the inner barrel. With such a structure, no deformation of the outer cylinder occurs, which in turn, helps to maintain a water-tight structure; also a stronger structure around the hexagonal nut receiving recess can be maintained.

Preferably, the inner barrel includes a stopper surface for determining the position of said outer barrel in the optical axis direction, wherein the center of the through-hole is offset from the center of the nut in a direction opposing the stopper surface when an edge surface of the outer barrel abuts against the stopper surface and the nut abuts against a surface of the nut receiving recess. Such a structure prevents any play between the inner and outer barrels.

Preferably, the outer barrel is made from metal and the inner barrel is made from a synthetic resin mold. Forming the outer barrel from metal provides the same advantages as the other aspect of the present invention mentioned above.

The present disclosure relates to subject matter contained in Japanese Patent Application No. 10-22908 (filed on Feb. 4, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
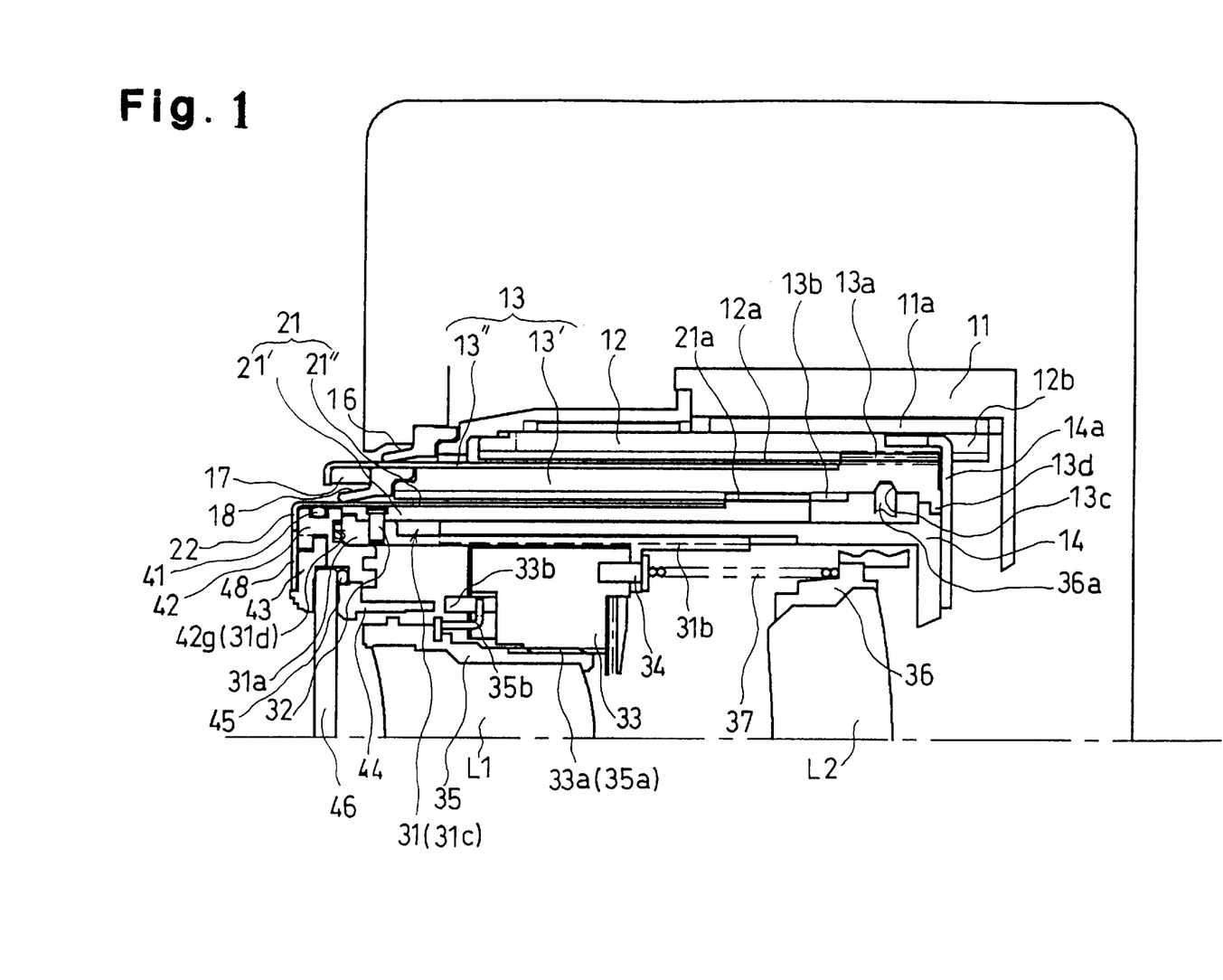
FIG. 1 is a sectional view of the upper half of a waterproof lens barrel in an assembled state.
Figure 2:
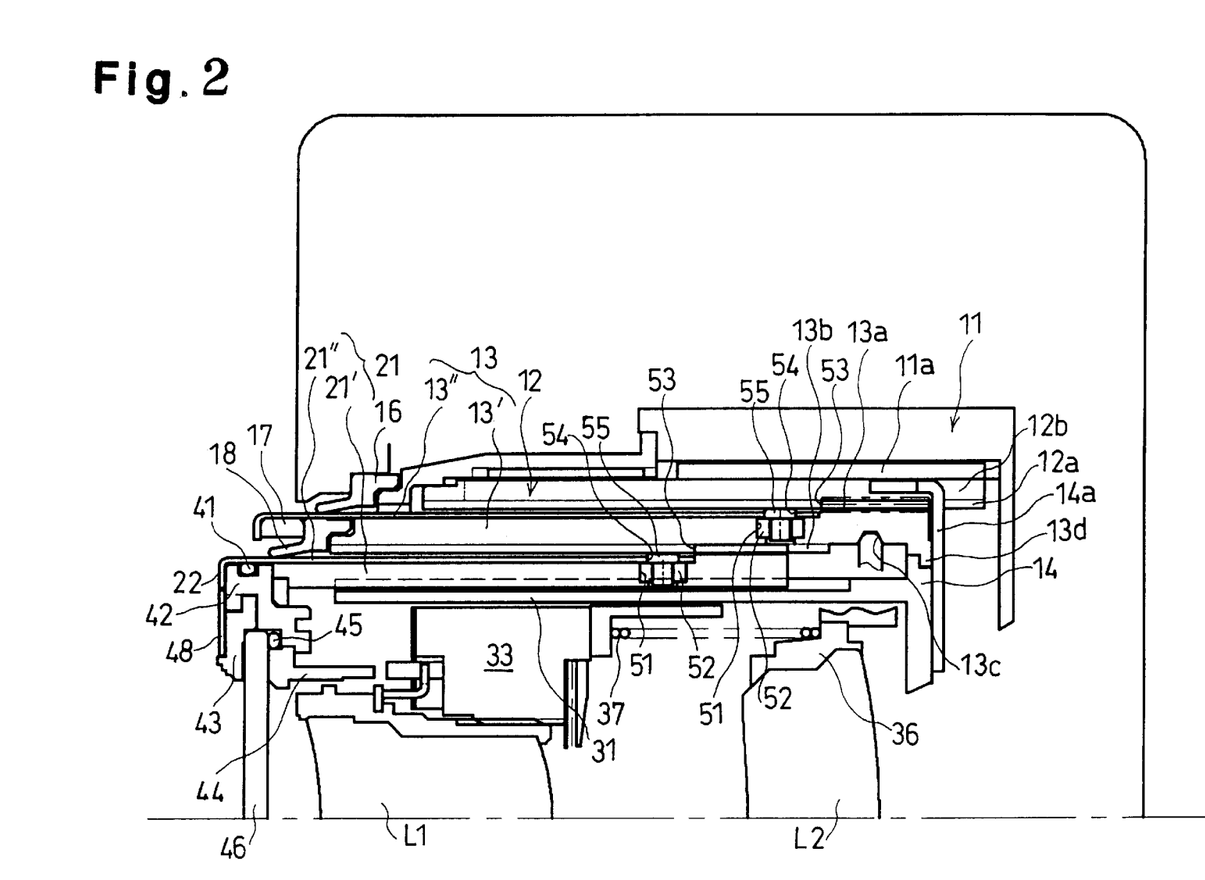
FIG. 2 is a sectional view of the upper half of the waterproof lens barrel of FIG. 1; wherein fixing components are further included, according to the present invention.
Figure 3:
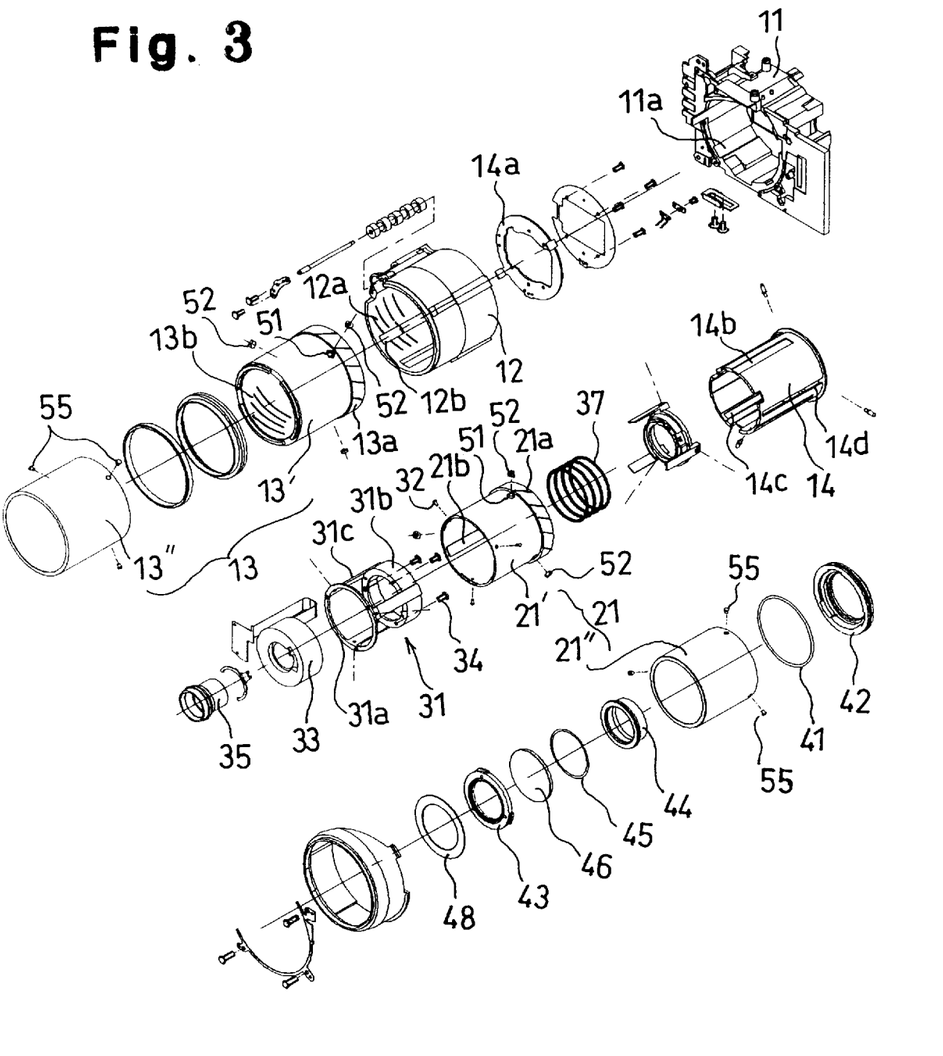
FIG. 3 is an exploded perspective view of the lens barrel according to the present invention.

FIGS. 1 through 3 show the overall construction of a waterproof lens barrel. A housing 11 which is fixed to a camera body is provided with a frame 12. The frame 12 is moveable in the direction of the optical axis along linear-movement guide groove 11a of the housing 11 upon back-focusing adjustment during assembly. After the back-focus adjustment is completed, the frame 12 remains permanently fixed to the housing 11. A female helicoid 12a and linear guide grooves 12b (which are parallel to the optical axis) are formed on the inner peripheral surface of the frame 12.

A first double-walled moveable barrel 13 having a first thicker inner barrel (cam ring) 13' and a first thinner outer barrel (decoration barrel) 13" is fitted inside the frame 12. The inner barrel 13' is formed from a synthetic resin mold. The inner barrel 13' is provided, on the outer peripheral surface thereof, with a male helicoid 13a which engages with the female helicoid of the frame 12 and, on the inner surface thereof, with a female helicoid 13b and a rear lens cam groove 13c. The inner barrel 13' is engaged with a linear movement guide ring 14 which is linearly guided via by the linear movement guide grooves 12b of the frame 12 so as to be relatively rotatable but not to be relatively moveable linearly in the optical axis direction. Specifically, a linear movement key plate 14a which is fixed to the rear end portion of the linear movement guide ring 14 is engaged with the linear movement guide grooves 12b of the frame 12, and an inner flange 13d formed on the rear end of the first inner barrel 13' is supported in between the linear movement guide ring 14 and the linear movement guide key plate 14a, while allowing rotational movement of the first inner barrel 13' relative to the linear movement guide ring 14.

The first outer barrel 13" is formed from a metal which provides increased surface precision and surface hardness; for example, an aluminum alloy pressing which has been alumetized on the outer surface thereof, or thin stainless steel. The first inner barrel 13' is snugly fitted in the outer barrel 13". A first annular waterproof packing 16 is elastically in contact with the outer periphery surface of the first outer barrel 13". A second annular waterproof packing 18 is fixed in place within the internal periphery at the front edge of the first double-walled barrel 13 (first outer barrel 13") via an annular spacer 17.

Positioned between the first double-walled barrel 13 and the linear movement guide ring 14 is a second double-walled barrel 21 which includes a second thicker inner barrel 21' and a second thinner outer barrel 21". The second inner barrel 21' is formed from a synthetic resin mold, and is provided at the rear end portion thereof with a male helicoid 21a which engages with the female helicoid 13b of the first inner barrel 13'. The second outer barrel 21", similar to the first outer barrel 13", is formed from a metal which provides increased surface precision and surface hardness; for example, an aluminum alloy pressing which has been alumetized on the outer surface thereof, or thin stainless steel.

The second inner barrel 21' is snugly fitted in the second outer barrel 21". An integral inner flange 22 is provided at the front end of the second outer barrel 21". The annular waterproof packing seal 18 is in elastic contact with the outer periphery of the second outer barrel 21".

Linear movement guide grooves 14b, in a direction parallel to the optical axis, are provided on the outer periphery of the linear movement guide ring 14. The guide grooves 14b are engaged with linear movement guide projections 21b which are formed in the inner peripheral surface of the second inner barrel 21' in a direction parallel to the optical axis. Accordingly, rotation of the second inner barrel 21' (second double-walled barrel 21) is prohibited, and hence, when the first inner barrel 13' (first double-walled barrel 13) is driven by a driving mechanism (not shown), the second double-walled barrel 21 is moved linearly in the direction of the optical axis via the engaging movement of the female helicoid 13b and the male helicoid 21a. Furthermore, when the first inner barrel 13' (first double-walled barrel 13) is rotated, the same is moved along the optical axis via the male helicoid 13a and the female helicoid 12a.

Accordingly, the linear movement guide ring 14 which is prohibited from rotating via the linear guide grooves 12b, is moved along with the first double-walled barrel 13 without rotating.

According to the above-described structure, when the first inner barrel 13' is rotated, the first double-walled barrel (cam ring) 13 moves linearly in the optical axis direction whilst in sliding contact with the first annular waterproof packing 16 and the second outer barrel 21" (second double-walled barrel 21) moves linearly with respect to the first outer barrel 13" in the optical axis direction whilst in sliding contact with the second annular water proof packing 18 which is fixed in place within the internal periphery of the front edge of the first outer barrel 13". The above describes the waterproof structure of the outer surfaces of the first and second double-walled barrels 13 and 21. Since both the first and second outer barrels 13" and 21" are made from a metal having an increased surface precision and surface hardness, the necessary drip-proof/waterproof properties can be maintained, due to the sliding contact of the first and second annular waterproof packings 16 and 18.

Figure 4:
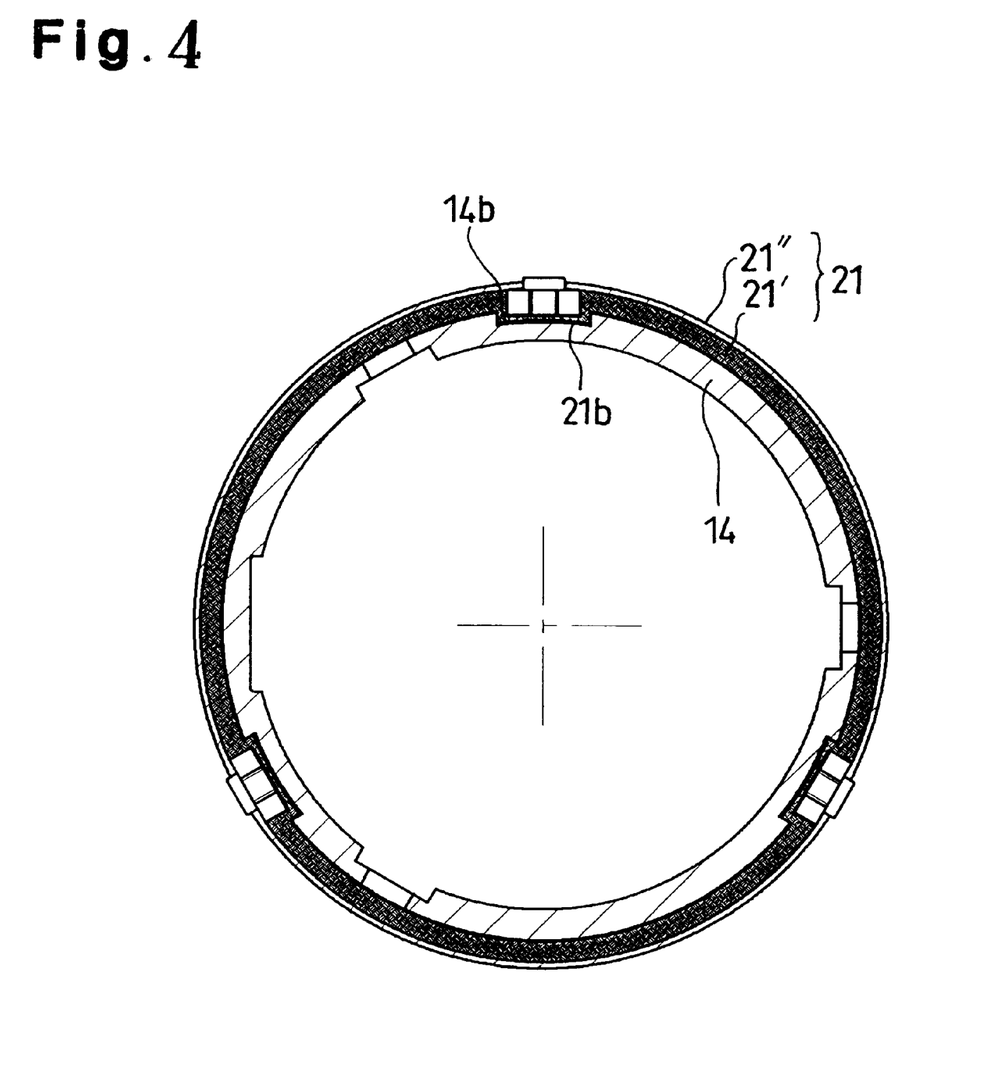
FIG. 4 is a sectional view of the fixing structure for the outer barrel and thicker inner barrel of the lens barrel (taken perpendicularly with respect to the optical axis)
Figure 5:
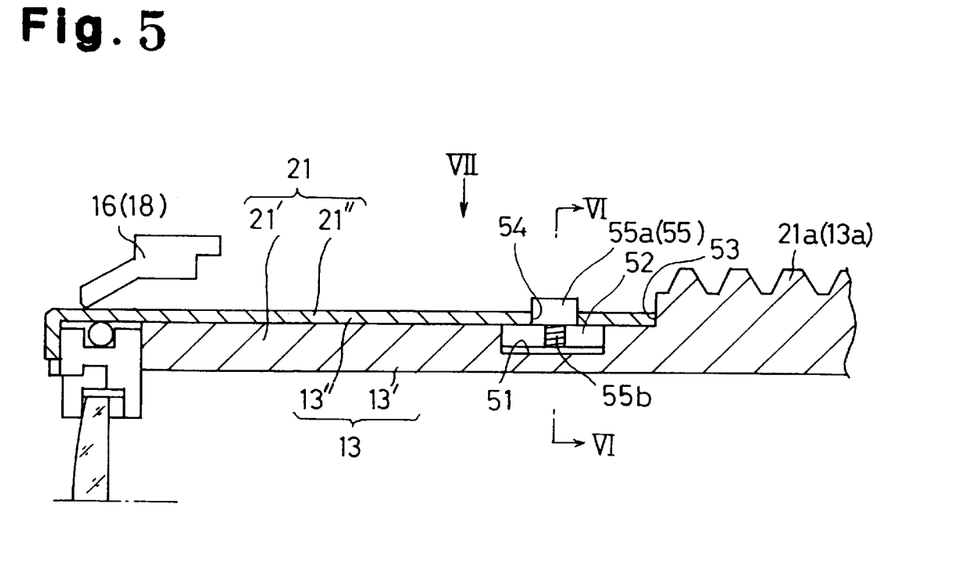
FIG. 5 is a sectional view of the outer barrel and the thicker inner barrel of the lens barrel according to the present invention.
Figure 6:
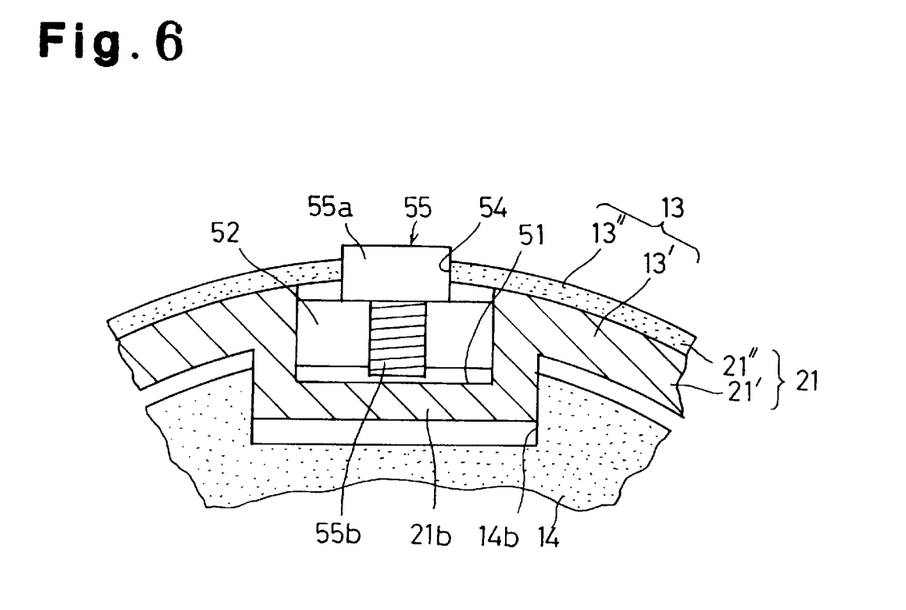
FIG. 6 is a sectional view taken from the line VI—VI of FIG. 5.

A water proof lens barrel structure according to the present embodiment is applied to the above-described first inner barrel 13' and first outer barrel 13", and second inner barrel 21' and second outer barrel 21", respectively. A plurality (three shown in the drawings) of hexagonal nut receiving recesses 51 are formed on the inner barrel 13' (21') at the same position with respect to the optical axis, at different circumferential positions. As can be seen in FIGS. 4, 5 and 6, a hexagonal nut 52 is inserted in each hexagonal nut receiving recess 51, so as to be immovable (and non-rotatable). Furthermore, a stopper surface 53 is provided, on the inner barrel 13' (21'), so as to abut with the rear edge surface of the outer barrel 13" (21") to prevent the outer barrels 13" (21") from moving back any further. The hexagonal nut shown in the drawings is an example of a non-circular nut. However, various other shaped non-circular nuts can also be utilized.

The outer barrel 13" (21") is provided with simple circular through-holes 54 having a predetermined diameter with high dimensional and positional precision. The through holes 54 are positioned exactly where the hexagonal nuts 52 are positioned when the rear edge of the outer barrel 13" (21") abuts against the stopper surface 53 of the inner barrel 13' (21). Stopper pins 55 constitute flat heads 55a which snugly fit into the through-holes 54 and male threads 55b which are screwed into hexagonal nuts. Since the flat heads 55a of the stopper pins 55 fit snuggly into the diameters of the through-holes 54, no force in the direction perpendicular to the optical axis is applied to the outer barrel 13" (21") and relative displacement in the optical axis direction between the outer and inner barrel does not occur. The peripheral surface of the flat heads 55a have a circular shape in plan view. The hexagonal nut receiving recesses 51 of the second inner barrel 21' are positioned where the linear movement guide projections 21b are formed, so that the hexagonal nut receiving recesses 51 are formed by utilizing the extra thickness of the linear movement guide projections 21b. The order of assembly of the above-described structure is as follows: firstly the hexagonal nuts 52 are inserted into the receiving recesses 51 of the inner barrel 13' (21'), the outer barrel 13" (21") is slidably fitted over the inner barrel 13' (21'), and the stopper pins 55 are inserted into the hexagonal nuts 52 and the flat heads 55a of the stopper pins 55 snuggly insert into the through-holes 54.

According to the above-described structure, the positions of the first and second inner barrels 13' and 21' in the radial direction, are determined according to the precision of the fitting engagement thereof and the positions thereof in the optical axis direction are determined according to the snug fitting of the stopper pins 55 into their corresponding through-holes 54. Therefore, there is no danger of the first and second outer barrels 13" and 21" deforming in shape by the stopper pins 55.

Figure 7:
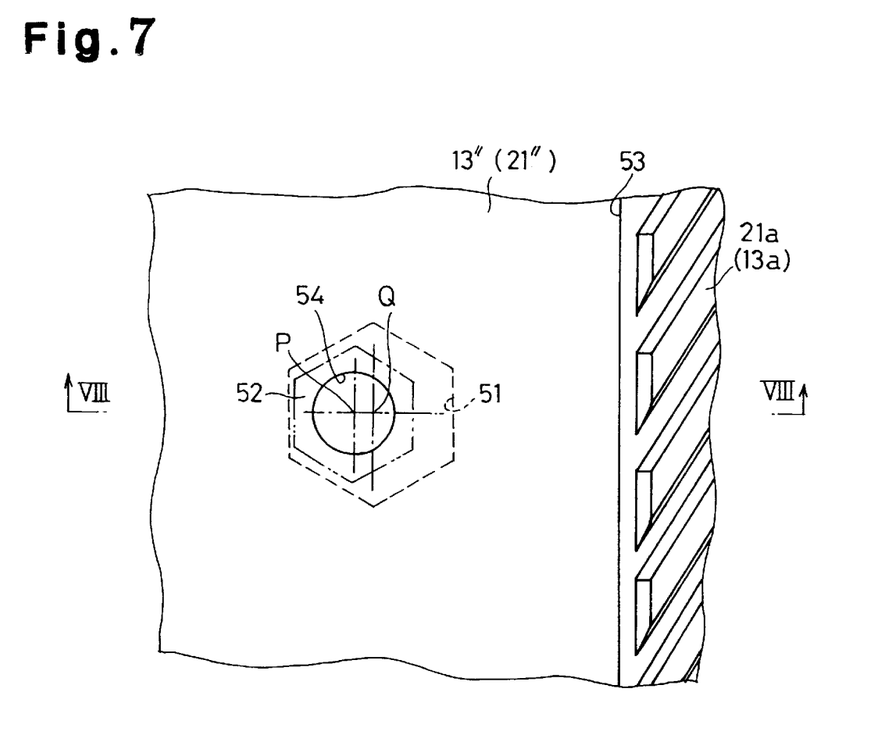
FIG. 7 is a view of a portion of the lens barrel in the direction of the arrow VII shown in FIG. 5.
Figure 8:
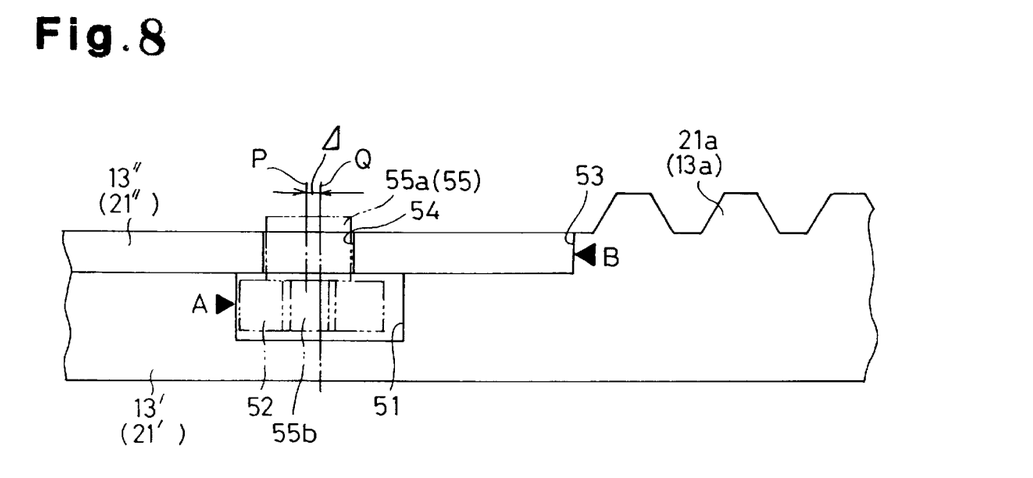
FIG. 8 is a sectional view taken from the line VIII—VIII in FIG. 7.

FIGS. 7 and 8 show another embodiment of the present invention, in which any play of the outer barrel 13" (21") in the direction of the optical axis with respect to the second outer barrel 13" (21") is prevented (reduced) due to the stopper surface 53 which is formed on the first and second inner barrels 13' and 21'. "P" represents the center of the circular through-hole 54 when the rear edge of the outer barrel 13" (21") abuts against the stopper surface 53 of the inner barrel 13' (21'), and "Q" represents the center of the hexagonal nut receiving recess 51. "P" is offset from "Q" by the amount away from the stopper surface 53. With such a setup, when the male thread 55b of the stopper pin 55 is screwed into the hexagonal nut 52, the flat head 55a applies force to the outer barrel 13" (21") toward the stopper surface 53 via the through-hole 54. In other words, since the hexagonal nut 52 is pressed against the surface 'A' of the hexagonal nut receiving recess 51 which opposes the stopper surface 53 (surface 'B'), the outer barrel 13" (21") is pressed against the stopper surface 53 (surface 'B'), and hence, any play in the optical axis direction of the outer barrel 13" (21") with respect to the inner barrel 13' (21') is eliminated. The amount of offset shown in FIGS. 7 and 8 has been exaggerated for illustration purposes, however, the actual amount of offset is very small.

It is possible to form female thread for the stopper pin to be screw engaged directly on the inner barrel 13' (or 21'). However, it is preferred to utilize the nut 52 and the nut receiving recess 51 to eliminate the play mentioned above. In addition, since the hexagonal nut 52 is made from metal, there is no danger of the threads of the hexagonal nut 52 being damaged.

The structure of the second double-walled barrel 21 including the inside structure thereof will be described in the following. A shutter mounting ring 31 is inserted inside the second double-walled barrel 21 and is fastened by fixing pins 32 (FIGS. 1 and 3). The shutter mounting ring 31 has a front annular portion 31a which is connected to a rear annular cylindrical portion 31b by a plurality of connection bars 31c. Fitting grooves 14c for accepting the connection bars 31c are formed the linear movement guide ring 14.

A shutter unit 33 is fastened to the rear cylindrical portion 31b of the shutter mounting ring 31 via fastening pins 34 (FIGS. 1 and 3). The shutter unit 33 is provided at a center portion thereof with a female helicoid 33a and a drive pin 33b which projects out at a position offset from the optical axis. A male helicoid 35a of the front lens frame 35 which holds the front lens group L1 is screw engaged to the female helicoid 33a. The drive pin 33b is engaged with an association lever 35b which is integral with the front lens frame 35. The drive pin 33b rotates about the optical axis by an angle corresponding to the object distance data obtained during the shutter release operation, and the front lens frame 35 (front lens group L1) is moved in the optical axis direction via the male helicoid 35a and female helicoid 33a while rotating according to the amount of rotation of the drive pin 33b.

A radially projecting follower pin 36a is provided integral to a rear lens frame 36 which supports the rear lens group L2. The follower pin 36a extends through a linear movement guide groove 14d (FIG. 3), which is parallel to the optical axis, and fits snugly into the rear lens cam groove 13c of the first inner barrel 13'. Furthermore, a backlash-eliminating compression coil spring 37 is inserted between the shutter mounting ring 31 and the rear lens frame 36 so that the rear lens frame 36 (rear lens group L2) is biased to move rearward from the shutter mounting ring 31.

As the shutter mounting unit 31 (including the shutter unit 33 which supports the front lens group L1) is fastened to the second inner barrel 21' (second double-walled barrel 21) as mentioned above, when the first inner barrel 13' (first double-walled barrel 13) is rotated, the shutter mounting unit 31 is moved in the optical axis direction due to the engagement of the male helicoid 21' and the female helicoid 13b, and at the same time, the rear lens frame 36 (rear lens group L2) moves, via the cam groove 13c, to thereby alter the distance between the rear lens frame 36 and the shutter mounting unit 31 (front lens group L1), whereby the focal length is altered.

A support ring 42 having an O-ring (annular sealing member) 41 is provided in between the second inner barrel 21' and the second outer barrel 21" to seal an annular gap therebetween. The supporting ring 42 supports a glass retaining ring 43, a light interception cylinder 44, an O-ring (annular sealing member) 45 and a transparent sealing glass plate 46, so as to constitute a water-tight structure for the second double-walled barrel 21.

As can be understood from the above, according to the present embodiment, in a waterproof lens barrel comprising a double-walled barrel having an outer barrel and an inner barrel, the outer barrel can be fastened to the inner barrel without being deformed.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A waterproof lens barrel comprising at least one water-tight movable barrel which is movable along an optical axis, said water-tight movable barrel comprising:

an outer barrel that is in sliding contact with an annular sealing member;

an inner barrel that is positioned inside said outer barrel;

at least one through-hole formed on said outer barrel; and at least one stopper pin that is supported by said inner barrel, said stopper pin being snugly fitted in said through-hole so that no force in the radial direction is inflicted on said outer barrel by said stopper pin and relative position of said inner and outer barrels in the direction of the optical axis is determined by said stopper pin and said through-hole.

2. A waterproof lens barrel according to claim 1, wherein said stopper pin comprises a flat head which is snuggly fitted into said through-hole and a male thread portion which is screw engaged with said inner barrel.

3. A waterproof lens barrel according to claim 2, wherein the peripheral surface of said flat head has a circular shape in plan view, and the diameter thereof being substantially the same as the diameter of said through-hole.

4. A waterproof lens barrel according to claim 3, wherein said inner barrel comprises at least one non-circular nut receiving recess for receiving a non-circular nut, and wherein said male thread portion of said stopper pin is securely screwed into said non-circular nut.

5. A waterproof lens barrel according to claim 4, wherein said inner barrel comprises a stopper surface that abuts against one end surface of said outer barrel, wherein the center of said through-hole is offset from the center of said nut in a direction opposing said stopper surface when said one end surface of said outer barrel abuts against said stopper surface.

6. A waterproof lens barrel according claim 1, wherein said inner barrel comprises a linear movement guide projection which protrudes inward, and wherein said nut receiving recess is formed by utilizing the extra thickness of the linear movement guide projection.

7. A waterproof lens barrel according claim 1, wherein said outer barrel is made from metal, and wherein said inner barrel is made from a synthetic resin mold.

8. A waterproof lens barrel comprising at least one water-tight movable barrel which is movable along an optical axis, said water-tight movable barrel comprising:

an outer barrel having at least one through-hole, said outer barrel being in sliding contact with an annular sealing member;

a stopper pin comprising a flat head and a male thread portion, the peripheral surface thereof having a circular shape in plan view, and the diameter thereof being substantially the same as the diameter of said at least through-hole;

an inner barrel supporting said stopper pin which snugly fits through said at least one through-hole, wherein no force in the radial direction is inflicted on said outer barrel by said stopper pin, said inner barrel being snugly fitted inside said outer barrel; and at least one nut receiving recess formed on the external periphery of said inner barrel, wherein a nut is inserted therein for receiving said stopper pin, said male thread portion of said stopper pin being securely screwed into said nut; wherein said at least one nut receiving recess is formed at the same circumferential position as at least one linear movement guide projection formed on the internal periphery of said inner barrel to thereby utilize a greater thickness thereat than the thickness of the rest of said inner barrel.

9. A waterproof lens barrel according to claim 8, wherein said inner barrel comprises a stopper surface for determining the position of said outer barrel in the optical axis direction, wherein the center of said through-hole is offset from the center of said nut in a direction opposing said stopper surface when an edge surface of said outer barrel abuts against said stopper surface and said nut abuts against a surface of said nut receiving recess.

10. A waterproof lens barrel according to claim 9, wherein said outer barrel is made from metal, and wherein said inner barrel is made from a synthetic resin mold.

* * * * *